United States Patent [19]
Anderson et al.

[11] Patent Number: 5,621,834
[45] Date of Patent: Apr. 15, 1997

[54] CLOSED ALIGNMENT SLEEVE FOR OPTICAL CONNECTORS

[75] Inventors: Jerry M. Anderson, Austell; Ray R. Cammons, Woodstock; Wilton W. King, Chamblee, all of Ga.

[73] Assignee: Lucent Technologies Inc., Murray Hill, N.J.

[21] Appl. No.: 362,094

[22] Filed: Dec. 22, 1994

[51] Int. Cl.⁶ .................................................. G02B 6/38
[52] U.S. Cl. ................................................ 385/72
[58] Field of Search ....................... 385/53–55, 60, 385/72, 76–78, 81, 84, 134, 136, 137, 139

[56] References Cited

U.S. PATENT DOCUMENTS

| | | | |
|---|---|---|---|
| Re. 31,515 | 2/1984 | Heldt | 385/78 X |
| 4,050,781 | 9/1977 | Beauhaire | 385/64 |
| 4,193,665 | 3/1980 | Arnold | 385/72 |
| 4,406,515 | 9/1983 | Roberts | 385/72 |
| 4,541,685 | 9/1985 | Anderson | 385/72 |
| 4,545,644 | 10/1985 | DeVeau, Jr. et al. | 385/64 |
| 4,691,986 | 9/1987 | Aberson, Jr. et al. | 385/66 |
| 4,850,670 | 7/1989 | Mathis et al. | 385/68 |
| 4,856,866 | 8/1989 | Freeman et al. | 385/72 |
| 4,880,291 | 11/1989 | Aberson, Jr. et al. | 385/55 |
| 5,101,463 | 3/1992 | Cubukciyan et al. | 385/72 |
| 5,179,607 | 1/1993 | Sellers et al. | 385/72 X |
| 5,220,630 | 6/1993 | DeVeau, Jr. et al. | 385/64 |
| 5,239,603 | 8/1993 | Sonoda et al. | 385/60 X |

OTHER PUBLICATIONS

W.W.King, "Interference of a Uniform Open Ring With a Rigid Cylinder", Journal of Applied Mechanics, vol. 56, Sep. 1989, pp. 717–719.

*Primary Examiner*—John D. Lee

[57] ABSTRACT

A closed alignment sleeve has three lands equally spaced on the inside surface of the sleeve. When a ferrule is inserted into the sleeve, the interference at the three lands causes the walls of the sleeve to bend to accommodate the ferrule. In this manner, the closed alignment sleeve with three lands has a stiffness attained by the mechanism normally associated with the open sleeve. The closed alignment sleeve is symmetrical and the three lands act to center the ferrule within the sleeve. The sleeve is formed from a thermoplastic which is much less expensive and much more compliant than conventional ceramic and which allows the sleeve to deform to the size of the ferrule. Further, the envelope required to contain the sleeve is small enough to fit within a variety of optical connectors, including the SC connector.

7 Claims, 4 Drawing Sheets

CLOSED ALIGNMENT SLEEVE FOR OPTICAL CONNECTORS

This invention relates to an alignment sleeve for aligning the ends of two optical fibers and, more particularly, to a closed alignment sleeve having a three-land configuration.

BACKGROUND OF THE INVENTION

Optical fiber splices and connectors, collectively designated hereinafter as "connectors," are necessary components of any optical fiber system. Inasmuch as optical fibers have finite lengths, it is necessary that a connector be able to splice the ends of two fibers together. Also, where a break occurs, a device, such as a connector, must be able to join the pieces of the broken fiber. In addition, in virtually all optical fiber transmission systems, the fiber or fibers terminate at either active or passive devices to which they must be connected by suitable connections. Such connections also make it possible to rearrange or reroute transmission paths and usually comprise one or more connector assemblies or sub-assemblies having some type of clamping or holding mechanism.

Regardless of the nature of the connection, the principal criteria for establishing such connection are that the connector must join two fiber ends with minimum insertion loss and that it must be mechanically stable in the working environment. Low insertion loss depends on fiber alignment, the optical flatness of the ends of the fibers to be joined, and a minimum gap between the fiber ends. Stability depends primarily upon the mechanical design of the connector, with particular emphasis upon minimizing thermal effects. In those connectors where the fibers being joined abut, the mechanical design must maintain the abutting relationship despite application of external forces.

In many optical connectors, a few millimeters of each end of the optical fiber is bonded within a coaxial bore of a ferrule. The end of each ferrule is polished to expose the optical fiber and the ends of two ferrules are forced against each other to couple the ends of the two fibers. To mate the ends of the ferrules and to maintain a proper alignment between the ends of the ferrules, the ferrules are typically inserted within an alignment sleeve.

The diameters of the ferrules are very small and may differ by several microns. An alignment sleeve must therefore be able to receive a range of ferrule diameters yet still conform as close as possible to the diameter of a ferrule. Additionally, an alignment sleeve must be able to conform to the size of the ferrule's diameter without causing an offset in transverse alignment. As a result, the opening of an alignment sleeve must be able to expand in order to accept a ferrule having a diameter which is larger than the opening of the alignment sleeve. In addition to being compliant, an alignment sleeve must be longitudinally rigid, which means that the alignment sleeve must be rigid enough to withstand forces that tend to move the ferrules out of alignment.

One type of alignment sleeve, which is rarely used, is a closed alignment sleeve of a cylindrical shape with an inside surface having a circular cross-section. To accommodate ferrules of different sizes, the walls of the sleeve must stretch, which, for most materials, requires a considerable force. While such a relatively rigid sleeve will provide nominally uniform contact between the sleeve and the ferrule, the sleeve cannot accept a ferrule with a diameter much larger than the sleeve. Because the closed sleeve does not easily conform to the shape of the ferrule, the closed alignment sleeve must be manufactured with very tight tolerances in order to have a satisfactory sleeve to wall interaction. As a result, the satisfactory closed sleeve of this type is difficult to manufacture and is relatively expensive.

Because of the difficulties and expenses in achieving these very tight tolerances, optical connectors frequently employ an open alignment sleeve, which has a slit formed along the length of the sleeve. The open sleeve expands to accommodate a ferrule by a bending action in the walls. Since the walls of the sleeve can bend much easier than stretch, the open sleeve is a much less rigid structure and consequently, has much less stringent manufacturing tolerances than the closed sleeve.

A typical open sleeve has a circularly shaped inside surface. For an example of an open sleeve, see, for instance, U.S. Pat. No. 4,850,670 to Mathis et al. In general, an open sleeve does not provide uniform contact with the ferrules. Instead, the contact between the ferrules and the open sleeve is isolated in the region near the slit and in a region directly opposite the slit. In all other areas of the open sleeve, the open sleeve usually does not contact the ferrules. For a more detailed discussion on the interference between an open sleeve and a ferrule, see, for instance, W. W. King, "Interference of a Uniform Open Ring With a Rigid Cylinder," Journal of Applied Mechanics, Sep. 1989, Vol. 56, pp. 717–719. The open sleeve therefore provides incomplete ferrule to sleeve contact.

The open sleeve has been modified to provide for more contact around the circumference of the sleeve. For instance, U.S. Pat. No. 4,541,685 to Anderson discloses an open sleeve in which the thickness of the sleeve's wall varies along the circumference of the sleeve to provide more uniform contact between the sleeve and the ferrules. This type of sleeve, however, is necessarily larger than a uniform thickness sleeve and is not suitable for many optical connectors.

A commonly used open sleeve is a ceramic sleeve having three lands spaced approximately 120° apart. The behavior of this sleeve, however, is similar to that of a typical open sleeve. Consequently, this sleeve is asymmetrical and structurally biased.

Other types of devices for aligning the ferrules are also known. For instance, U.S. Pat. No. 4,050,781 to Beauhaire, U.S. Pat. No. 4,545,644 to DeVeau, Jr. et al., U.S. Pat. No. 5,220,630 to DeVeau, Jr. et al., and U.S. Pat. No. 4,880,291 to Aberson, Jr. et al. all disclose a generally triangularly shaped clip in which the ends of the fibers are inserted between three alignment rods. This type of alignment device is advantageous in that it provides three lines of contact with the ends of the fibers. Also, U.S. Pat. No. 4,691,986 to Aberson, Jr. et al. discloses a variety of alignment sleeves, including rigid and compliant shell continuous sleeves and corrugated sleeves.

Another type of open sleeve is disclosed in U.S. Pat. No. 4,205,898 to Matthews et al. This type of sleeve is formed from tubular spring metal and has a delta-shaped cross-section. One side of the sleeve has a pair of spring flaps which move outwardly to accept an inserted ferrule. Because this is an open sleeve, this sleeve is asymmetric and has a structural bias.

Many of these alignment devices, however, are too large for many of the existing optical connectors, such as an SC connector. Thus, a need exists for an alignment sleeve which may fit within existing optical connectors, have less structural bias, and be easily and inexpensively manufactured.

SUMMARY OF THE INVENTION

The present invention, in a preferred embodiment thereof, is a closed alignment sleeve for receiving a ferrule and which comprises an inner surface having a generally circular cross section. Three projections extend from the inner surface of the sleeve and are formed along a length of the sleeve. The projections are angularly equally spaced apart from each other on the inner surface of the sleeve and are for contacting a ferrule when the ferrule is inserted within the sleeve. While the walls of a conventional closed sleeve stretch to accommodate a ferrule, the walls of the closed alignment sleeve according to the invention bend as a result of the contact of the projections with the ferrule.

In a preferred embodiment, the closed alignment sleeve is formed from a thermoplastic material which enables the sleeve to deform to the size of an inserted ferrule. The sleeve has an outer diameter of approximately 3.20 mm and a length of approximately 10.10 mm. The projections are about 0.10 mm in height and the inner diameter of the sleeve is sized to receive a 2.5 mm diameter ferrule. The three projections advantageously center the ferrule within the sleeve.

In a second aspect of the invention, a closed sleeve for receiving a ferrule has a cylindrical wall with an inner surface having a generally circular cross-section. The wall of the sleeve is deformed to have three lobes which are formed along a length of the sleeve and which are spaced at equal angles. The three lobes contact the ferrule and deform outwardly to accept the ferrule. Preferably, the sleeve is formed from a metal, such as beryllium copper, and has cut-outs for decoupling the deformations associated with the two ferrules.

The principles and features of the present invention will be more readily apparent and understood from the following detailed description, read in conjunction with the accompanying drawings.

DETAILED DESCRIPTION

Figure 1:
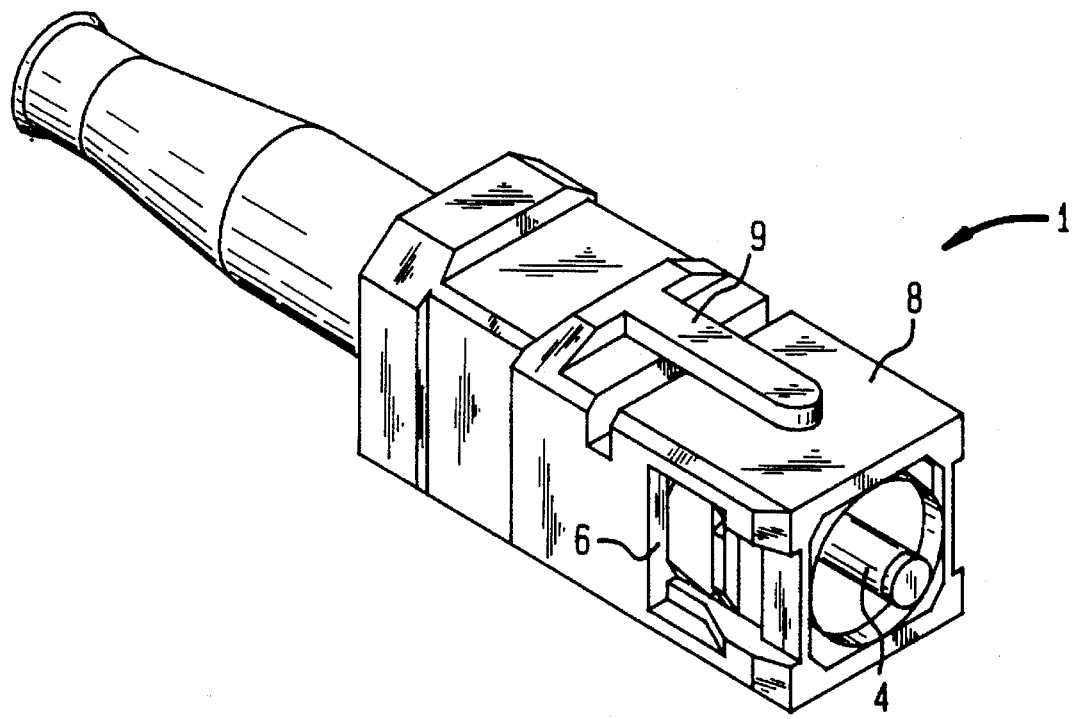
FIG. 1 is a perspective view of an SC fiber optic connector.

The SC connector is a commonly used singlemode optical connector suitable for use in many applications, such as in telecommunication networks, cable television, local area networks, and equipment interconnect. An example of one end of the SC connector 1 is shown in FIG. 1. The SC connector 1 includes a ferrule assembly (not shown) having an optical fiber terminating ferrule 4. The ferrule 4 and ferrule assembly are disposed within a plug frame 8 such that an end portion of the ferrule 4 is biased outwardly from one end of the plug frame 8 by a spring.

Figure 2A:
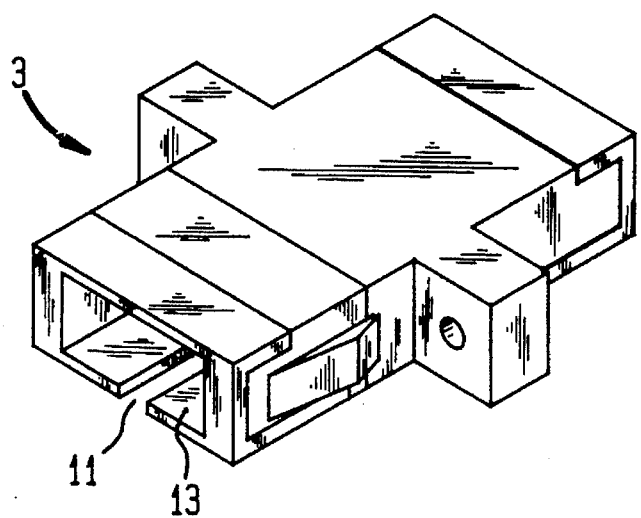
FIG. 2(A) is a perspective view of a coupling for an SC connector.
Figure 2B:
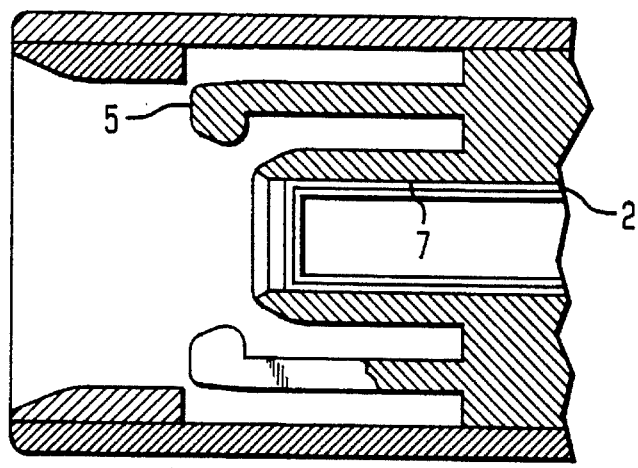
FIG. 2(B) is a cross-sectional view of the coupling for the SC connector.

The ferrule 4 and a ferrule 4 from the other end of the SC connector 1 are inserted within a coupling, such as coupling 3 in FIGS. 2(A) and 2(B). The coupling 3 has an opening 13 for receiving the SC connector 1 and has a notch 11 formed in one wall for receiving a ridge 9 formed on the SC connector 1, thereby aligning the SC connector 1 within the coupling 3. The latching arms 5 on the coupling 3 and the beveled entry surfaces 6 of the SC connector 1 together form a snap-lock for retaining the SC connector 1 within the coupling 3.

The coupling 3 has a sleeve retaining member 7 for holding an alignment sleeve 2. When the SC connectors 1 are inserted into the coupling 3, the ends of the ferrules 4 are placed within the alignment sleeve 2 to thereby position the ferrules 4 relative to each other. The outer diameter of the sleeve retaining member 7 cannot have a diameter greater than 4.79 mm and the inner diameter of the sleeve 2 must be able to receive a 2.5 mm ferrule 4. The space within the coupling 3 for the sleeve retaining member 7 and the sleeve 2 itself is therefore extremely limited. As a result, many of the known alignment devices are too large for use in the SC connector.

Figure 3A:
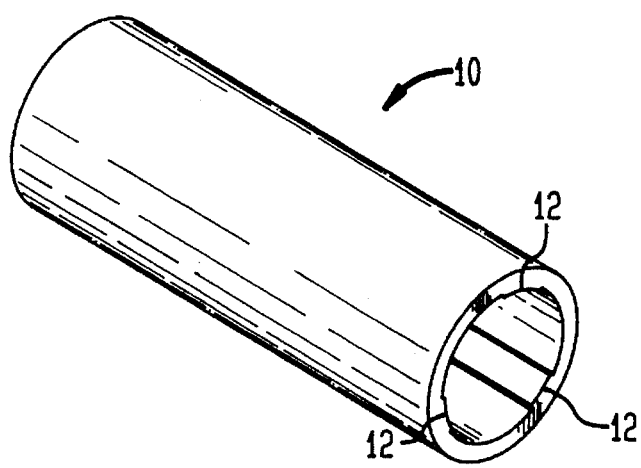
FIG. 3(A) is a perspective view of a preferred embodiment of an alignment sleeve according to the invention.
Figure 3B:
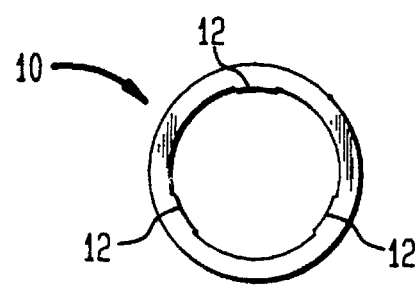
FIG. 3(B) is an end view of an alignment sleeve according to the preferred embodiment of the invention.

A plastic sleeve 10 according to a preferred embodiment of the invention is small enough to fit within an SC connector 1 and coupling 3. The sleeve 10, as shown in FIGS. 3(A) and 3(B), is a closed sleeve having three lands 12. Each land 12 is angularly spaced equally apart from the other lands 12 on the inside surface of the sleeve 10, with the center of each land 12 being 120 degrees from the centers of the other lands 12. The sleeve 10 has an outer diameter of approximately 3.20 mm and has a length of approximately 10.10 mm. The inner diameter of the sleeve 10 at the bottom of the lands 12 is approximately 2.596 mm and is approximately 2.495 mm at the tops of the lands 12. Thus, the lands 12 are approximately 0.10 mm in height. The walls of the sleeve 10 have a thickness of approximately 0.30 mm.

Each of the lands 12 preferably extends through an included angle of approximately 30° across the inner circumference of the sleeve 10. In the example shown in FIGS. 3(A) and 3(B), the tops of the lands are approximately 0.646 mm in width and the bottoms of the lands 12 are approximately 0.730 mm in width. The curvature of the tops of the lands 12 is concentric with the curvature of the outer surface of the sleeve 10, as well as with the curvature of the inner surface of the sleeve 10.

The sleeve 10 must be formed from a material which is flexible enough to comply with variations in the diameters of the ferrule, yet stiff enough to hold and align the ferrule during the insertion process and also during the lifetime of the connector. The sleeve 10 must have an adequate creep resistance for aging and have a surface hardness to resist wear and to resist smearing when the ferrules are inserted. Additionally, the material must be flame retardant.

The closed alignment sleeve 10 is preferably produced from a thermo-plastic material and, more specifically, from polysulfone, polyether sulfone, or a liquid crystal polymer. A number of suitable liquid crystal polymers are disclosed in U.S. Pat. No. 5,101,463 and include polyether sulfone (PES), polycarbonate (PC), polybutylene, terephtalate (PBT), polyphenylene sulfide (PPS), polyether ether ketone (PEEK), polyether imide (PEI). Another suitable thermoplastic is manufactured by Hoechst-Celanese Corporation under the name of "Vectra A130"®. This thermo-plastic is a high end thermo-plastic that holds its dimensions well over a large temperature range, is exceptionally stable, and is a fairly rigid thermo-plastic.

The alignment sleeve 10 according to the invention has an outside diameter which is small enough to fit within an SC coupling 3. Inasmuch as the sleeve 10 is a closed sleeve, it provides improved performance under vibration and shock in comparison to an open sleeve, which has a slit that can open with motion of the connector. Moreover, in comparison to ceramic sleeves, the sleeve 10 according to the invention, which uses a thermo-plastic, is much cheaper to produce. Further, whereas the open sleeve provides two points of contact and could not completely center the ferrule within the sleeve, the sleeve 10 according to the invention provides contact along three 120° points and centers the optical fiber within the sleeve 10.

The sleeve 10 which, according to the invention has three lands 12, has a stiffness which is less than that of a conventional closed sleeve. Instead of stretching the walls of the sleeve to accommodate a larger diameter ferrule, the walls of the sleeve 10 bend due to the contact of the ferrule with the lands 12. More specifically, the walls of the sleeve 10 are pushed outwardly at the locations of the lands 12, thereby pushing the walls of the sleeve 10 inwardly at locations midway between the lands 12. The sleeve 10 has the symmetry of a closed sleeve combined with the lower stiffness which has been usually only associated with the open sleeve.

A more detailed analysis of the mechanics of a three-land 12 closed sleeve 10 having a radius R will now be provided. This analysis will establish that the closed sleeve 10 can be formed with a material having a low value for Young's modulus yet perform similar to an open sleeve formed from a material having a high value for Young's modulus.

Figure 4:
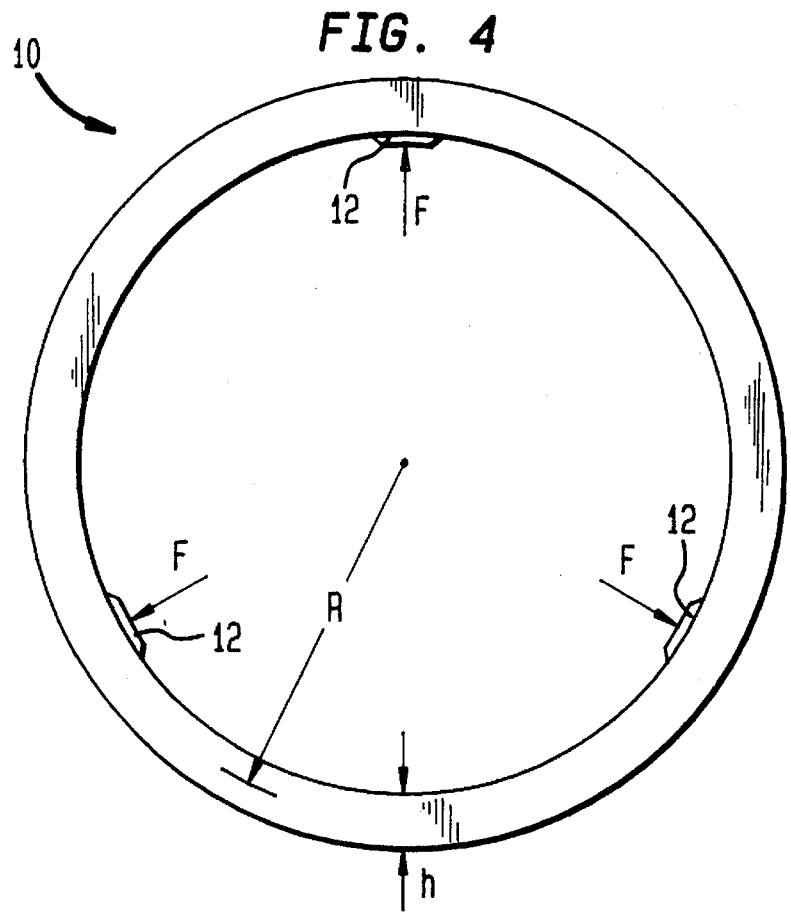
FIG. 4 is a cross-sectional view of the alignment sleeve of the invention illustrating concentrated loads.

With reference to FIG. 4, between the lands 12 which are 120° apart, the sleeve 10 is taken to be a thin, elastic, cylindrical sleeve 10 deformed in a state of plane strain. In other words, the deformation is independent of the longitudinal position. It is assumed that the lands 12 are sufficiently narrow that the interaction with a ferrule can be taken to be along three load lines F. The considerations of the assumed symmetry dictate that the forces-per-unit-length F be equal and that each load-point experience an actual radial displacement one-half the diametral interference of the ferrule and sleeve 10.

In a plane of a representative cross section, as shown in FIG. 4, the deformation will be symmetric about the points of load application, which is a point of contact between the ferrule and the lands 12, and also about points midway between them.

Figure 5:
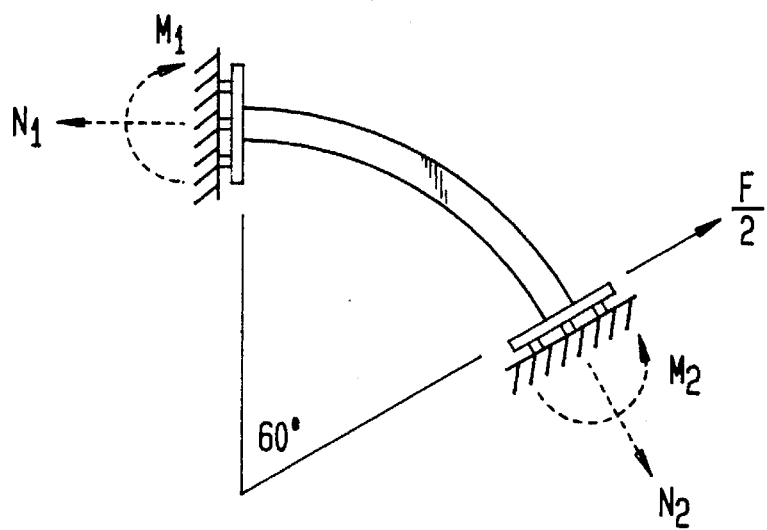
FIG. 5 is a diagram of a characteristic 60 degrees segment of the sleeve.

The analysis will focus on a characteristic 60° segment, as shown in FIG. 5. Applying principles of statics to a free body diagram of a segment, a stress resultant $N_1$ at a first point can be determined as follows:

$$N_1 = \frac{F}{\sqrt{3}}. \quad \text{(EQ. 1)}$$

Figure 6:
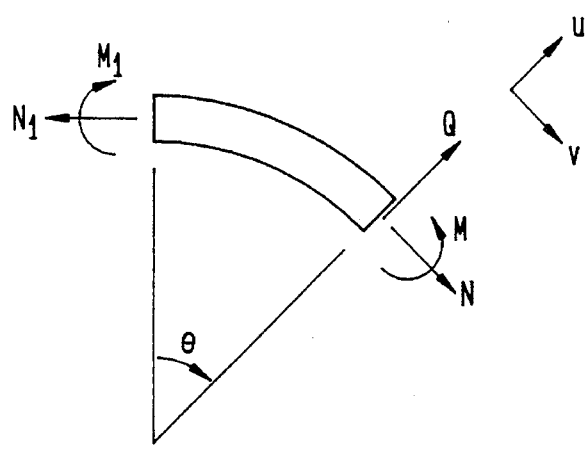
FIG. 6 is a diagram of the stress resultants and displacement components for the segment of FIG. 5.

With reference to FIG. 6, a free-body diagram is generated by cutting the characteristic 60° segment of FIG. 5. In FIG. 6, N, Q, and M are the force and moment resultants per unit length and u and v are the displacement components.

When equations of equilibrium are applied, the force and moment resultants per unit length can be determined as follows:

$$N = N_1 \cos\theta = \frac{F}{\sqrt{3}} \cos\theta, \quad \text{(EQ. 2)}$$

$$Q = N_1 \sin\theta = \frac{F}{\sqrt{3}} \sin\theta, \text{ and} \quad \text{(EQ. 3)}$$

$$\begin{aligned}M &= NR - N_1 R + M_1 \\ &= \frac{FR}{\sqrt{3}} \cos\theta - \frac{FR}{\sqrt{3}} + M_1 = \frac{FR}{\sqrt{3}} \cos\theta + C_1.\end{aligned} \quad \text{(EQ. 4)}$$

The force and moment resultants N and M can also be expressed as follows:

$$N = \frac{S}{R}\left[u + \frac{dv}{d\theta}\right], \quad \text{(EQ. 5)}$$

$$M = \frac{B}{R^2}\left[\frac{d^2u}{d\theta^2} - \frac{dv}{d\theta}\right], \quad \text{(EQ. 6)}$$

where $$S = \frac{Eh}{1-v^2}, \text{ and} \quad \text{(EQ. 7)}$$

$$B = \frac{Eh^3}{12(1-v^2)}, \quad \text{(EQ. 8)}$$

and where E is Young's modulus, v is Poisson's ratio, and h is the thickness of the sleeve 10.

By combining equations 5 and 6, it can further be shown that:

$$\frac{d^2u}{d\theta^2} + u = \frac{R^2M}{B} + \frac{RN}{S}$$

$$= \frac{FR^3}{\sqrt{3} B}\left[1 + \frac{B}{SR^2}\right] + \frac{C_1R^2}{B},$$

$$u = \frac{C_1R^2}{B} + C_2\sin\theta + C_3\cos\theta +$$

$$\frac{FR^3}{2\sqrt{3} B}\left[1 + \frac{B}{SR^2}\right]\theta\sin\theta,$$

$$\frac{du}{d\theta} = C_2\cos\theta - C_3\sin\theta +$$

$$\frac{FR^3}{2\sqrt{3} B}\left[1 + \frac{B}{SR^2}\right](\sin\theta + \theta\cos\theta).$$

From the above equations and from the boundary conditions that $du/d\theta$ and v equal 0 at angles θ of 0 and π/3, it is determined that the unknown $C_2$ equals 0 and that:

$$\frac{dv}{d\theta} = \frac{FR}{\sqrt{3} S} \cos\theta - \frac{C_1R^2}{B} - C_3\cos\theta - \quad \text{(EQ. 12)}$$

$$\frac{FR^3}{2\sqrt{3} B}\left[1 + \frac{B}{SR^2}\right]\theta\sin\theta,$$

and $$v = \frac{FR}{\sqrt{3} S}\sin\theta - \frac{C_1R^2\theta}{B} - C_3\sin\theta - \quad \text{(EQ. 13)}$$

$$\frac{FR^3}{2\sqrt{3} B}\left[1 + \frac{B}{SR^2}\right](-\theta\cos\theta + \sin\theta) + C_4.$$

From the boundary condition that v equals 0 at an angles θ of 0, the unknown $C_4$ is determined to equal 0. When equations 11 and 13 are solved for $C_3$ at an angle θ of π/3 and the equations for $C_3$ are set to equal each other, the resultant moment per unit length M can be determined as follows:

$$M = \frac{FR}{\sqrt{3}} \cos\theta - \frac{3}{2\pi} FR. \quad \text{(EQ. 14)}$$

To relate the force-per-unit-length F to the interference, let 2δ be a diametral interference between a rigid ferrule and the sleeve lands 12. At an angle θ of π/3, the displacement component u would equal δ. The value of δ is determined as:

$$\delta = \frac{FR^3}{2B} \left[ -\frac{3}{\pi} + \left[ \frac{1}{2\sqrt{3}} + \frac{2\pi}{9} \right] \left[ 1 + \frac{B}{SR^2} \right] \right]. \quad \text{(EQ. 15)}$$

For a thin sleeve, $B/SR_2 = h_2/12R_2$ and the quantity $(1+B/SR_2)$ is approximately equal to 1. This approximation leads to the same results that would have been obtained by an a priori assumption of inextensibility. Thus, for all reasonable values of h/R, $$F = 60 \frac{B\delta}{R^3}, \quad \text{(EQ. 16)}$$

and the maximum moment $M_{max}$ occurs at an angle θ of π/3 and is given by the following equation:

$$M_{max} = 11 \frac{B\delta}{R^2}. \quad \text{(EQ. 17)}$$

Thus, the deformation will be symmetric at points located every 60 degrees along the sleeve's inner circumference. As discussed above, these points correspond to the locations of the lands 12 and also to points midway between the lands.

In contrast to the sleeve 10 according to the invention, a three land split sleeve, such as the commonly used ceramic split sleeve, has the following characteristics:

$$F = 1.2 \frac{B\delta}{R^3} \quad \text{(EQS. 18 AND 19)}$$

$$M_{max} = 1.2 \frac{B\delta}{R^2}.$$

Thus, for the same material and geometric parameters, the bending stresses for the open sleeve are about 10% of those for a closed sleeve.

The commonly used ceramic split sleeve is characterized by the following parameters: $E = 3 \times 10^7$ psi; v=0.3; h/R=¼; and a maximum δ of about 0.2 mil. A closed sleeve 10 with three lands may be designed to have the same forces-of-interaction F by using a thinner sleeve, a lower elastic modulus, and/or a different range of interferences. If the thickness and interference were the same in both the split sleeve and a closed sleeve 10 according to the invention, then the same forces-of-interaction may be achieved by the selection of a plastic having a Young's modulus of $E=(3 \times 10^7)/50 = 6 \times 10^5$ psi. Since common engineering plastics exist which have such a Young's modulus, the closed sleeve 10 according to the invention may be designed to have the same forces-of-interaction as the ceramic split sleeve.

While the invention has been described with reference to an SC connector 1 and coupling 3, the alignment sleeve may be dimensioned for use with other connectors or couplings. Also, the sleeve 10 is not limited to the specific lands 12 disclosed but may be formed with projections having other shapes. For instance, the shape of the projections may be altered to provide better contact with an inserted ferrule. The outer surface of the sleeve also need not have a circular cross section, but may have a different shape. Furthermore, the sleeve 10 is not limited to only the materials described but may be formed from other materials apparent to those of skill in the art.

Figure 7A:
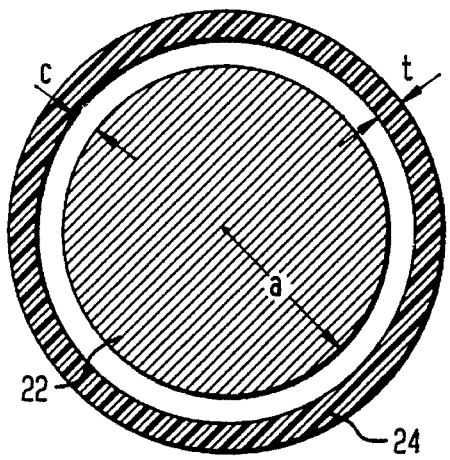
FIGS. 7(A), (B), and (C) illustrate a preferred process for producing a sleeve according to a second embodiment of the invention.
Figure 7B:
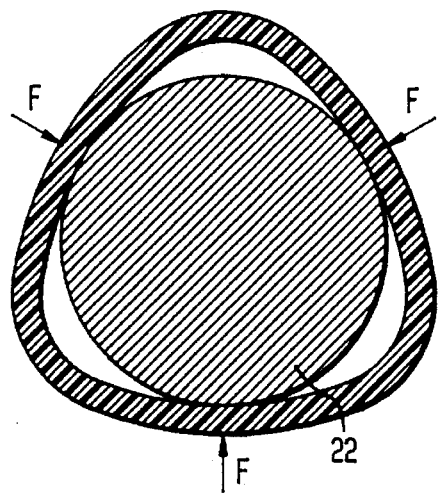
Figure 7C:
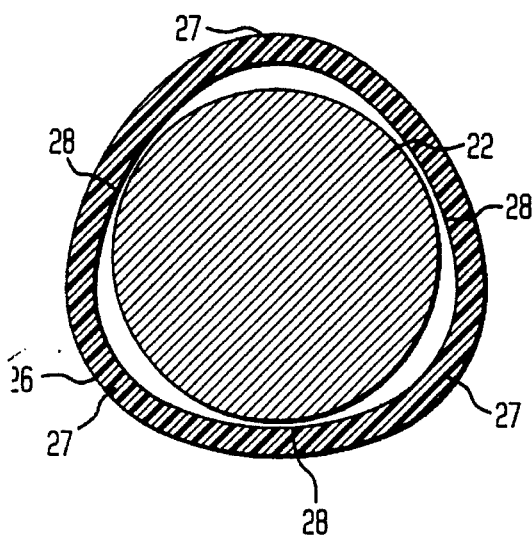
Figure 8:
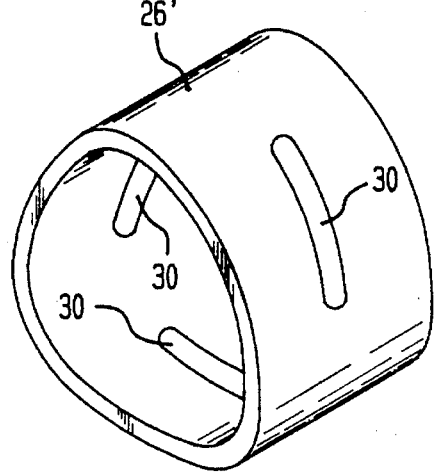
FIG. 8 is a perspective view of a third embodiment of the invention.

In another aspect of the invention, a closed sleeve may be formed from metal according to a process depicted in FIGS. 7(A), 7(B), and 7(C). With reference to FIG. 7(A), a rod or mandrel 22, which is diametrically smaller than a ferrule, is placed within a metal tube 24. As shown in FIG. 7(B), the tube 24 is then compressed with forces F directed toward the center of the tube 24 at angular difference of 120 degrees. The forces F have a magnitude greater than the elastic limit of the tube 24 to thereby deform the tube 24 into a sleeve 26 having three lobes 28, as shown in FIG. 7(C).

The sleeve 26 may be formed from many suitable metals and is preferable formed from beryllium copper. The magnitude of the forces F, the size a of the rod 22, the thickness t of the tube 24 may be varied to select a sleeve 26 of a desired size and producing a desired interference.

The metal closed sleeve 26 according to the invention has three lobes 28 for contacting an inserted ferrule and for centering the ferrule within the sleeve 26. The three lobes 28 are deformed outwardly to accept a larger-sized ferrule whereby the sleeve 26 can accept ferrules of different diameters. Further, the sleeve 26 is small enough to fit within an SC connector 1 and coupling 3.

In a further aspect of the invention, a closed sleeve 26' may be formed with cut-outs 30. The cut-outs 30 function to decouple a deformation at one end of the sleeve 26' caused by one ferrule from the deformation at the other end of the sleeve 26' caused by the other ferrule. Thus, a deformation caused by a ferrule inserted into one end of the sleeve 26' will have less of an effect on the interference between the other ferrule and the sleeve 26'.

A process for producing a sleeve 26, which is preferred over that shown in FIGS. 7(A), 7(B), and 7(C), subjects a tube 24 to forces F to deform the tube to have three lobes. A rod or mandrel of a certain diameter is then inserted into the sleeve to outwardly deform the lobes to ensure that the lobes are uniformly deformed.

The foregoing has been illustrative of the features and principles of the present invention. Various changes or modifications to the invention may be apparent to workers in the art without departure from the spirit and scope of the invention.

We claim:

1. An alignment sleeve for use in receiving a ferrule, said alignment sleeve having a cylindrical wall with an inner surface having a generally circular cross-section, said alignment sleeve having means for contacting said ferrule when said ferrule is inserted within said sleeve and for centering said ferrule within said sleeve, said contacting means comprising three lobes formed along a length of said sleeve on said inner surface of said sleeve which are angularly equally spaced about said inner surface, and wherein said sleeve further includes means for decoupling deformation at a first end of said sleeve from a second end of said sleeve.

2. The alignment sleeve as set forth in claim 1, wherein said cylindrical wall of said sleeve and said lobes are formed from a metal.

3. The alignment sleeve as set forth in claim 2, wherein said metal is beryllium copper.

4. The alignment sleeve as set forth in claim 1, wherein said decoupling means comprises at least one cut-out formed along an angular arc of said wall approximately midway along a length of said wall.

5. The alignment sleeve as set forth in claim 1, wherein said decoupling means comprises three cut-outs formed along an angular arc of said wall approximately midway along a length of said wall and equally spaced about a circumference of said sleeve.

6. The alignment sleeve as set forth in claim 1, further comprising means for deforming said wall at locations between said lobes.

7. The alignment sleeve as set forth in claim 6, wherein said deforming means comprises means for coupling forces received at said three lobes from said ferrule to said locations on said cylindrical wall between said lobes.

* * * * *